United States Patent
Cox et al.

(10) Patent No.: US 8,518,256 B2
(45) Date of Patent: Aug. 27, 2013

(54) MEMBRANE MODULE

(75) Inventors: David John Cox, Penrith (AU); Fufang Zha, West Ryde (AU); Joachim Muller, Thornleigh (AU); Cinzia Lea, Winston Hills (AU); George Schneider, Bad Kreuznach (DE)

(73) Assignee: Siemens Industry, Inc., Alpharetta, GA (US)

( * ) Notice: Subject to any disclaimer, the term of this patent is extended or adjusted under 35 U.S.C. 154(b) by 255 days.

(21) Appl. No.: 13/087,548

(22) Filed: Apr. 15, 2011

(65) Prior Publication Data

US 2011/0192783 A1     Aug. 11, 2011

Related U.S. Application Data

(62) Division of application No. 11/197,969, filed on Aug. 5, 2005, now Pat. No. 7,931,463, which is a division of application No. 10/676,458, filed on Sep. 30, 2003, now Pat. No. 6,974,554.

(30) Foreign Application Priority Data

Apr. 4, 2001 (AU) .................................. PR4215

(51) Int. Cl.
*B01D 63/02*     (2006.01)
*B01D 69/08*     (2006.01)

(52) U.S. Cl.
USPC ............... 210/321.89; 210/321.8; 210/500.23

(58) Field of Classification Search
USPC ............... 210/321.78–321.8, 321.87–321.89, 210/500.23; 425/501, 120, 123, 127, 130, 425/425
See application file for complete search history.

(56) References Cited

U.S. PATENT DOCUMENTS

| | | |
|---|---|---|
| 256,008 A | 4/1882 | Leak |
| 285,321 A | 9/1883 | Tams |
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |

(Continued)

FOREIGN PATENT DOCUMENTS

| | | |
|---|---|---|
| AU | 34400/84 A | 4/1985 |
| AU | 55847/86 A | 9/1986 |

(Continued)

OTHER PUBLICATIONS

English translation of JP 11033365 A.*

(Continued)

*Primary Examiner* — John Kim

(57) ABSTRACT

A membrane module includes at least one hollow fiber membrane; a first resin layer formed around an end of the at least one hollow fiber membrane; and a second resin layer chemically bound to the first resin layer, wherein the second resin layer is of greater flexibility than the first resin layer.

10 Claims, 2 Drawing Sheets

(56) References Cited

U.S. PATENT DOCUMENTS

| | | |
|---|---|---|
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |

| Patent | Date | Name |
|---|---|---|
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |

| | | | |
|---|---|---|---|
| 6,066,401 A | 5/2000 | Stilburn | |
| 6,071,404 A | 6/2000 | Tsui | |
| 6,074,718 A | 6/2000 | Puglia et al. | |
| 6,077,435 A | 6/2000 | Beck et al. | |
| 6,083,393 A | 7/2000 | Wu et al. | |
| 6,096,213 A | 8/2000 | Radovanovic et al. | |
| 6,113,782 A | 9/2000 | Leonard | |
| 6,120,688 A | 9/2000 | Daly et al. | |
| 6,126,819 A | 10/2000 | Heine et al. | |
| 6,146,747 A | 11/2000 | Wang et al. | |
| 6,149,817 A | 11/2000 | Peterson et al. | |
| 6,156,200 A | 12/2000 | Zha et al. | |
| 6,159,373 A | 12/2000 | Beck et al. | |
| 6,162,020 A | 12/2000 | Kondo | |
| 6,193,890 B1 | 2/2001 | Pedersen et al. | |
| 6,202,475 B1 | 3/2001 | Selbie et al. | |
| 6,214,231 B1 | 4/2001 | Cote et al. | |
| 6,214,232 B1 | 4/2001 | Baurmeister et al. | |
| 6,221,247 B1 | 4/2001 | Nemser et al. | |
| 6,245,239 B1 | 6/2001 | Cote et al. | |
| 6,254,773 B1 | 7/2001 | Biltoft | |
| 6,264,839 B1 | 7/2001 | Mohr et al. | |
| 6,277,512 B1 | 8/2001 | Hamrock et al. | |
| 6,280,626 B1 | 8/2001 | Miyashita et al. | |
| 6,284,135 B1 | 9/2001 | Ookata | |
| 6,290,756 B1 | 9/2001 | Macheras et al. | |
| 6,294,039 B1 | 9/2001 | Mahendran et al. | |
| 6,299,773 B1 | 10/2001 | Takamura et al. | |
| 6,303,026 B1 | 10/2001 | Lindbo | |
| 6,303,035 B1 | 10/2001 | Cote et al. | |
| 6,315,895 B1 | 11/2001 | Summerton et al. | |
| 6,319,411 B1 | 11/2001 | Cote | |
| 6,322,703 B1 | 11/2001 | Taniguchi et al. | |
| 6,324,898 B1 | 12/2001 | Cote et al. | |
| 6,325,928 B1 | 12/2001 | Pedersen et al. | |
| 6,325,938 B1 | 12/2001 | Miyashita et al. | |
| 6,331,248 B1 | 12/2001 | Taniguchi et al. | |
| 6,337,018 B1 | 1/2002 | Mickols | |
| RE37,549 E | 2/2002 | Mahendran et al. | |
| 6,349,835 B1 | 2/2002 | Saux et al. | |
| 6,354,444 B1 | 3/2002 | Mahendran et al. | |
| 6,361,695 B1 | 3/2002 | Husain et al. | |
| 6,368,819 B1 | 4/2002 | Gaddy et al. | |
| 6,372,138 B1 | 4/2002 | Cho et al. | |
| 6,375,848 B1 | 4/2002 | Cote et al. | |
| 6,383,369 B2 | 5/2002 | Elston | |
| 6,387,189 B1 | 5/2002 | Groschl et al. | |
| 6,402,955 B2 | 6/2002 | Ookata | |
| 6,406,629 B1 | 6/2002 | Husain et al. | |
| 6,423,214 B1 | 7/2002 | Lindbo | |
| 6,423,784 B1 | 7/2002 | Hamrock et al. | |
| 6,432,310 B1 | 8/2002 | Andou et al. | |
| 6,440,303 B2 | 8/2002 | Spriegel | |
| D462,699 S | 9/2002 | Johnson et al. | |
| 6,444,124 B1 | 9/2002 | Onyeche et al. | |
| 6,468,430 B1 | 10/2002 | Kimura et al. | |
| 6,471,869 B1 | 10/2002 | Yanou et al. | |
| 6,485,645 B1 | 11/2002 | Husain et al. | |
| 6,495,041 B2 | 12/2002 | Taniguchi et al. | |
| 6,517,723 B1 | 2/2003 | Daigger et al. | |
| 6,524,481 B2 | 2/2003 | Zha et al. | |
| 6,524,733 B1 | 2/2003 | Nonobe | |
| 6,550,747 B2 | 4/2003 | Rabie et al. | |
| 6,555,005 B1 | 4/2003 | Zha et al. | |
| 6,562,237 B1 | 5/2003 | Olaopa | |
| 6,576,136 B1 | 6/2003 | De Moel et al. | |
| 6,592,762 B2 | 7/2003 | Smith | |
| D478,913 S | 8/2003 | Johnson et al. | |
| 6,613,222 B2 | 9/2003 | Mikkelson et al. | |
| 6,620,319 B2 | 9/2003 | Behmann et al. | |
| 6,623,643 B2 | 9/2003 | Chisholm et al. | |
| 6,627,082 B2 | 9/2003 | Del Vecchio et al. | |
| 6,632,358 B1 | 10/2003 | Suga et al. | |
| 6,635,179 B1 | 10/2003 | Summerton et al. | |
| 6,641,733 B2 | 11/2003 | Zha et al. | |
| 6,645,374 B2 | 11/2003 | Cote et al. | |
| 6,656,356 B2 | 12/2003 | Gungerich et al. | |
| 6,682,652 B2 | 1/2004 | Mahendran et al. | |
| 6,685,832 B2 | 2/2004 | Mahendran et al. | |
| 6,696,465 B2 | 2/2004 | Dellaria et al. | |
| 6,702,561 B2 | 3/2004 | Stillig et al. | |
| 6,706,185 B2 | 3/2004 | Goel et al. | |
| 6,706,189 B2 | 3/2004 | Rabie et al. | |
| 6,708,957 B2 | 3/2004 | Cote et al. | |
| 6,712,970 B1 | 3/2004 | Trivedi | |
| 6,721,529 B2 | 4/2004 | Chen et al. | |
| 6,723,242 B1 | 4/2004 | Ohkata et al. | |
| 6,723,758 B2 | 4/2004 | Stone et al. | |
| 6,727,305 B1 | 4/2004 | Pavez Aranguiz | |
| 6,743,362 B1 | 6/2004 | Porteous et al. | |
| 6,755,970 B1 | 6/2004 | Knappe et al. | |
| 6,758,972 B2 | 7/2004 | Vriens et al. | |
| 6,761,826 B2 | 7/2004 | Bender | |
| 6,770,202 B1 | 8/2004 | Kidd et al. | |
| 6,780,466 B2 | 8/2004 | Grangeon et al. | |
| 6,783,008 B2 | 8/2004 | Zha et al. | |
| 6,790,347 B2 | 9/2004 | Jeong et al. | |
| 6,790,912 B2 | 9/2004 | Blong | |
| 6,805,806 B2 | 10/2004 | Arnaud | |
| 6,808,629 B2 | 10/2004 | Wouters-Wasiak et al. | |
| 6,811,696 B2 | 11/2004 | Wang et al. | |
| 6,814,861 B2 | 11/2004 | Husain et al. | |
| 6,821,420 B2 | 11/2004 | Zha et al. | |
| 6,830,782 B2 | 12/2004 | Kanazawa | |
| 6,840,251 B2 | 1/2005 | Gill et al. | |
| 6,841,070 B2 | 1/2005 | Zha et al. | |
| 6,861,466 B2 | 3/2005 | Dadalas et al. | |
| 6,863,816 B2 | 3/2005 | Austin et al. | |
| 6,863,817 B2 | 3/2005 | Liu et al. | |
| 6,863,818 B2 | 3/2005 | Daigger et al. | |
| 6,863,823 B2 | 3/2005 | Cote | |
| 6,869,534 B2 | 3/2005 | McDowell et al. | |
| 6,872,305 B2 | 3/2005 | Johnson et al. | |
| 6,881,343 B2 | 4/2005 | Rabie et al. | |
| 6,884,350 B2 | 4/2005 | Muller | |
| 6,884,375 B2 | 4/2005 | Wang et al. | |
| 6,890,435 B2 | 5/2005 | Ji et al. | |
| 6,890,645 B2 | 5/2005 | Disse et al. | |
| 6,893,568 B1 | 5/2005 | Janson et al. | |
| 6,899,812 B2 | 5/2005 | Cote et al. | |
| 6,936,085 B2 | 8/2005 | DeMarco | |
| 6,946,073 B2 | 9/2005 | Daigger et al. | |
| 6,952,258 B2 | 10/2005 | Ebert et al. | |
| 6,955,762 B2 | 10/2005 | Gallagher et al. | |
| 6,962,258 B2 | 11/2005 | Zha et al. | |
| 6,964,741 B2 | 11/2005 | Mahendran et al. | |
| 6,969,465 B2 | 11/2005 | Zha et al. | |
| 6,974,554 B2 | 12/2005 | Cox et al. | |
| 6,994,867 B1 | 2/2006 | Hossainy et al. | |
| 7,005,100 B2 | 2/2006 | Lowell | |
| 7,014,763 B2 | 3/2006 | Johnson et al. | |
| 7,018,530 B2 | 3/2006 | Pollock | |
| 7,018,533 B2 | 3/2006 | Johnson et al. | |
| 7,022,233 B2 | 4/2006 | Chen | |
| 7,041,728 B2 | 5/2006 | Zipplies et al. | |
| 7,052,610 B2 | 5/2006 | Janson et al. | |
| 7,083,733 B2 | 8/2006 | Freydina et al. | |
| 7,087,173 B2 | 8/2006 | Cote et al. | |
| 7,122,121 B1 | 10/2006 | Ji | |
| 7,147,777 B1 | 12/2006 | Porteous | |
| 7,147,778 B1 | 12/2006 | DiMassimo et al. | |
| 7,160,455 B2 | 1/2007 | Taniguchi et al. | |
| 7,160,463 B2 | 1/2007 | Beck et al. | |
| 7,160,464 B2 | 1/2007 | Lee et al. | |
| 7,172,699 B1 | 2/2007 | Trivedi et al. | |
| 7,172,701 B2 | 2/2007 | Gaid et al. | |
| 7,186,344 B2 | 3/2007 | Hughes | |
| 7,208,091 B2 | 4/2007 | Pind et al. | |
| 7,223,340 B2 | 5/2007 | Zha et al. | |
| 7,226,541 B2 | 6/2007 | Muller et al. | |
| 7,247,238 B2 | 7/2007 | Mullette et al. | |
| 7,264,716 B2 | 9/2007 | Johnson et al. | |
| 7,279,100 B2 | 10/2007 | Devine | |
| 7,279,215 B2 | 10/2007 | Hester et al. | |
| 7,300,022 B2 | 11/2007 | Muller | |
| 7,314,563 B2 | 1/2008 | Cho et al. | |
| 7,329,344 B2 | 2/2008 | Jordan et al. | |
| 7,344,645 B2 | 3/2008 | Beck et al. | |

| | | |
|---|---|---|
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0075495 A1 | 4/2003 | Dannstrom et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0198283 A1 | 8/2011 | Zha et al. |
| 2012/0091602 A1 | 4/2012 | Cumin et al. |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898 Y | 8/1995 |
| CN | 2236049 Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 012557 B1 | 2/1983 |
| EP | 126714 A2 | 11/1984 |
| EP | 050447 B1 | 10/1985 |
| EP | 194735 A2 | 9/1986 |
| EP | 250337 A1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60-206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05023557 A | 2/1993 |

| | | | | | | | |
|---|---|---|---|---|---|---|---|
| JP | 05096136 | A | 4/1993 | JP | 10286441 | A | 10/1998 |
| JP | 05137977 | A | 6/1993 | JP | 10328538 | A | 12/1998 |
| JP | 05157654 | A | 6/1993 | JP | 11005023 | A | 1/1999 |
| JP | 05161831 | A | 6/1993 | JP | 11028339 | A | 2/1999 |
| JP | 05184884 | A | 7/1993 | JP | 11028467 | A | 2/1999 |
| JP | 05279447 | A | 10/1993 | JP | 11031025 | A | 2/1999 |
| JP | 05285348 | A | 11/1993 | JP | 11033365 | A | 2/1999 |
| JP | 05305221 | A | 11/1993 | JP | 11033367 | A | 2/1999 |
| JP | 06-027215 | A | 2/1994 | JP | 11076769 | A | 3/1999 |
| JP | 06071120 | A | 3/1994 | JP | 11076770 | A | 3/1999 |
| JP | 06114240 | A | 4/1994 | JP | 11090189 | A | 4/1999 |
| JP | 06170364 | A | 6/1994 | JP | 11156166 | A | 6/1999 |
| JP | 06190250 | A | 7/1994 | JP | 11156360 | A | 6/1999 |
| JP | 06218237 | A | 8/1994 | JP | 11165200 | A | 6/1999 |
| JP | 06238273 | A | 8/1994 | JP | 11179171 | A | 7/1999 |
| JP | 06277469 | A | 10/1994 | JP | 11300177 | A | 11/1999 |
| JP | 06285496 | A | 10/1994 | JP | 11302438 | A | 11/1999 |
| JP | 06292820 | A | 10/1994 | JP | 11309351 | A | 11/1999 |
| JP | 06343837 | A | 12/1994 | JP | 11319501 | A | 11/1999 |
| JP | 07000770 | A | 1/1995 | JP | 11319507 | A | 11/1999 |
| JP | 07024272 | A | 1/1995 | JP | 11333265 | A | 12/1999 |
| JP | 07047247 | A | 2/1995 | JP | 2000000439 | A | 1/2000 |
| JP | 07068139 | A | 3/1995 | JP | 200051670 | | 2/2000 |
| JP | 07136470 | A | 5/1995 | JP | 2000051669 | A | 2/2000 |
| JP | 07136471 | A | 5/1995 | JP | 2000061466 | A | 2/2000 |
| JP | 07155564 | A | 6/1995 | JP | 200079390 | | 3/2000 |
| JP | 07155758 | A | 6/1995 | JP | 2000070684 | A | 3/2000 |
| JP | 7-39921 | | 7/1995 | JP | 2000-093758 | | 4/2000 |
| JP | 07178323 | A | 7/1995 | JP | 2000-157845 | | 6/2000 |
| JP | 07185268 | A | 7/1995 | JP | 2000157850 | A | 6/2000 |
| JP | 07185270 | A | 7/1995 | JP | 2000185220 | A | 7/2000 |
| JP | 07185271 | A | 7/1995 | JP | 2000189958 | A | 7/2000 |
| JP | 07185272 | A | 7/1995 | JP | 2000233020 | A | 8/2000 |
| JP | 07204635 | A | 8/1995 | JP | 2000237548 | A | 9/2000 |
| JP | 07236819 | A | 9/1995 | JP | 2000300968 | A | 10/2000 |
| JP | 07-256253 | | 10/1995 | JP | 2000317276 | A | 11/2000 |
| JP | 07251043 | A | 10/1995 | JP | 2000334276 | A | 12/2000 |
| JP | 07275665 | A | 10/1995 | JP | 2000342932 | A | 12/2000 |
| JP | 07289860 | A | 11/1995 | JP | 2001009246 | A | 1/2001 |
| JP | 07303895 | A | 11/1995 | JP | 2001070967 | A | 3/2001 |
| JP | 07313973 | A | 12/1995 | JP | 2001079366 | A | 3/2001 |
| JP | 08010585 | A | 1/1996 | JP | 2001079367 | A | 3/2001 |
| JP | 8039089 | A | 2/1996 | JP | 2001104760 | A | 4/2001 |
| JP | 08197053 | A | 8/1996 | JP | 2001120963 | A | 5/2001 |
| JP | 08323161 | A | 12/1996 | JP | 2001-510396 | T | 7/2001 |
| JP | 08332357 | A | 12/1996 | JP | 2001179059 | A | 7/2001 |
| JP | 09000890 | A | 1/1997 | JP | 2001179060 | A | 7/2001 |
| JP | 09038470 | A | 2/1997 | JP | 2001190937 | A | 7/2001 |
| JP | 09038648 | A | 2/1997 | JP | 2001190938 | A | 7/2001 |
| JP | 09072993 | A | 3/1997 | JP | 2001205055 | A | 7/2001 |
| JP | 09075689 | A | 3/1997 | JP | 2001232160 | A | 8/2001 |
| JP | 09099227 | A | 4/1997 | JP | 2001-269546 | | 10/2001 |
| JP | 09103655 | A | 4/1997 | JP | 2002011472 | A | 1/2002 |
| JP | 09103661 | A | 4/1997 | JP | 2002143849 | A | 5/2002 |
| JP | 9117647 | A | 5/1997 | JP | 2002177746 | A | 6/2002 |
| JP | 9138298 | A | 5/1997 | JP | 3302992 | B2 | 7/2002 |
| JP | 09141063 | A | 6/1997 | JP | 2002-527229 | A | 8/2002 |
| JP | 09155345 | A | 6/1997 | JP | 2002525197 | T | 8/2002 |
| JP | 09187628 | A | 7/1997 | JP | 2002263407 | A | 9/2002 |
| JP | 09192458 | A | 7/1997 | JP | 2002-336663 | | 11/2002 |
| JP | 09220569 | A | 8/1997 | JP | 2003024751 | | 1/2003 |
| JP | 09271641 | A | 10/1997 | JP | 2003047830 | A | 2/2003 |
| JP | 09313902 | A | 12/1997 | JP | 2003053157 | A | 2/2003 |
| JP | 09324067 | A | 12/1997 | JP | 2003053160 | A | 2/2003 |
| JP | 10015365 | A | 1/1998 | JP | 200371254 | A | 3/2003 |
| JP | 10024222 | A | 1/1998 | JP | 2003062436 | A | 3/2003 |
| JP | 10033955 | A | 2/1998 | JP | 2003135935 | A | 5/2003 |
| JP | 10048466 | A | 2/1998 | JP | 2003190976 | A | 7/2003 |
| JP | 10066972 | A | 3/1998 | JP | 2003-265597 | | 9/2003 |
| JP | 10076144 | A | 3/1998 | JP | 2003-275548 | A | 9/2003 |
| JP | 10076264 | A | 3/1998 | JP | 2003266072 | A | 9/2003 |
| JP | 10085562 | A | 4/1998 | JP | 2003275759 | A | 9/2003 |
| JP | 10085565 | A | 4/1998 | JP | 2003340250 | A | 12/2003 |
| JP | 10085566 | A | 4/1998 | JP | 2004-008981 | | 1/2004 |
| JP | 10156149 | A | 6/1998 | JP | 2004073950 | A | 3/2004 |
| JP | 10180048 | A | 7/1998 | JP | 2004-230287 | A | 8/2004 |
| JP | 10225685 | A | 8/1998 | JP | 2004216263 | A | 8/2004 |
| JP | 10235168 | A | 9/1998 | JP | 2004230280 | A | 8/2004 |
| JP | 10249171 | A | 9/1998 | JP | 2004249168 | A | 9/2004 |

| | | | |
|---|---|---|---|
| JP | 2004322100 A | 11/2004 |
| JP | 2004337730 A | 12/2004 |
| JP | 2004536710 A | 12/2004 |
| JP | 2005502467 A | 1/2005 |
| JP | 2005087887 A | 4/2005 |
| JP | 2005144291 A | 6/2005 |
| JP | 2005154551 A | 6/2005 |
| JP | 2005279447 A | 10/2005 |
| JP | 2006-116495 | 5/2006 |
| JP | 2007-547083 | 8/2010 |
| JP | 4833353 B2 | 12/2011 |
| KR | 20-0232145 | 7/2001 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 2005-063478 | 6/2005 |
| NL | 1006390 C2 | 12/1998 |
| NL | 1020491 C | 10/2003 |
| NL | 1021197 C | 10/2003 |
| NO | 20053769 A | 2/2006 |
| NZ | 510394 A | 5/2003 |
| NZ | 537874 A | 2/2007 |
| TW | 347343 | 12/1998 |
| WO | 8501449 A1 | 4/1985 |
| WO | 8605116 A1 | 9/1986 |
| WO | 8605705 A1 | 10/1986 |
| WO | 8800494 A1 | 1/1988 |
| WO | 8801529 A1 | 3/1988 |
| WO | 88001895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 9629142 A1 | 9/1996 |
| WO | 9641676 A1 | 12/1996 |
| WO | 9706880 A2 | 2/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 99-55448 A1 | 11/1999 |
| WO | 9959707 A1 | 11/1999 |
| WO | 0018498 A1 | 4/2000 |
| WO | 0030742 A1 | 6/2000 |
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0226363 A2 | 4/2002 |
| WO | 0230550 A1 | 4/2002 |
| WO | 0240140 A1 | 5/2002 |
| WO | 0247800 A1 | 6/2002 |
| WO | 03000389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005077499 A1 | 8/2005 |
| WO | 2005082498 A1 | 9/2005 |
| WO | 2005107929 A2 | 11/2005 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066350 A1 | 6/2006 |
| WO | 2007053528 A2 | 5/2007 |
| WO | 2007065956 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |

OTHER PUBLICATIONS

English translation of FR 2699424 A1.*
Coulson et al., "Coulson and Richardson's Chemical Engineering," 1999, vol. 1, pp. 358-364.
Cui et al., "Airlift crossflow membrane filtration—a feasibility study with dextran ultrafiltration," J. Membrane Sci. (1997) vol. 128, pp. 83-91.
"Chemical Cleaning Definition", Lenntech BV, Lenntech Water treatment & purification Holding B.V., Chemical Cleaning.
Almulla et al., Desalination, 153 (2002), pp. 237-243.
Anonymous, "Nonwoven Constructions of Dyneon" THV and Dyneon "THE Fluorothermoplastics", Research Disclosure Journal, Apr. 1999, RD 420013, 2 pages.
Cote et al., Wat. Sci. Tech. 38(4-5) (1998), pp. 437-442.
Cote, et al. "A New Immersed Membrane for Pretreatment to Reverse Osmosis" Desalination 139 (2001) 229-236.
Crawford et al., "Procurement of Membrane Equipment: Differences Between Water Treatment and Membrane Bioreactor (MBR) Applications" (2003).
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent, N. et al., Desalination 131 (2000) 353-362.
Dow Chemicals Company, "Filmtec Membranes—Cleaning Procedures for Filmtec FT30 Elements," Tech Facts, Online, Jun. 30, 2000, XP002237568.
Husain, H. et al., "The Zenon experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
International Search Report dated May 31, 2002 for corresponding PCT Application No. PCT/AU02/00436.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999 Chapters 2 and 5.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system" Water Research, Elsevier, Amsterdam, NL, vol. 37, No. 5, Mar. 2003.

Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Mark et al., "Peroxides and Peroxy Compounds, Inorganic" Kirk—Othmer Encyclopedia of Chemical Technology, Peroxides and Peroxy Compounds, Inorganic, To Piping Systems, New York, Wiley & Sons, Ed., Jan. 1, 1978, pp. 14-18.

MicroCTM—Carbon Source for Wastewater Denitrification. Information from Environmental Operating Solutions website including MSDS.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.

Rosenberger et al., Desalination, 151 (2002), pp. 195-200.

U.S. Appl. No. 60/278,007, filed Mar. 23, 2001.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwmrw.interscience.wiley.com/eow/.

Webster's Ninth New Collegiate Dictionary, Merriam-Webster Inc., Publishers, Springfield, Massachusetts, USA, Copyright 1986, p. 1298.

White et al., The Chemical Engineering Journal, 52 (1993), pp. 73-77.

Wikipedia, "Seawater," available at http://en.wikipedia.org/wiki/Seawater, Jul. 15, 2007.

Yamamoto et al., Water Science Technology, vol. 2, pp. 43-54; 1989.

Yoon: "Important operational parameters of membrane bioreactor-sludge disintegration (MBR-SD) system for zero excess sludge production" Water Research, Elsevier, Amsterdam, NL, vol. 37, No. 8, Apr. 2003.

Zenon, "Proposal for ZeeWeed® Membrane Filtration Equipment System for the City of Westminster, Colorado, Proposal No. 479-99," Mar. 2000, entire publication.

* cited by examiner

MEMBRANE MODULE

This application is a divisional application, under 35 U.S.C. §120, of U.S. patent application Ser. No. 11/197,969, filed on 5 Aug. 2005, now U.S. Pat. No. 7,931,463, which claimed priority as a divisional application, under 35 U.S.C. §120, of U.S. patent application Ser. No. 10/676,458, filed on 30 Sep. 2003 now U.S. Pat. No. 6,974,554, which claimed the benefit of International Patent Application No. PCT/AU02/00436, filed on 4 Apr. 2002, under the Patent Cooperative Treaty (PCT), which designated the U.S. and claimed the benefit of Australian Provisional Patent Application No. PR 4215, filed 4 Apr. 2001.

TECHNICAL FIELD

The present invention relates to potting methods for porous hollow fibre membranes typically used in filtration systems.

BACKGROUND

The potting materials used to support and hold arrays of porous hollow fibre membranes are usually a compromise between materials which have sufficient rigidity to provide adequate support but sufficient softness and flexibility to avoid breakage of the fibres where they enter the pot. Too rigid a material produces rapid breakage of fibres adjacent the pot while too soft a material does not have sufficient mechanical strength to adequately support the fibres. The materials are also chosen to resist breakdown as a result of exposure to various types of feed as well as cleaning fluids used to maintain the fibres.

Known systems employ single layers of epoxy, polyurethane or silicon materials, however, each suffer from the disadvantages outlined above.

The present invention seeks to overcome or at least ameliorate one or more of the disadvantages of the prior art outlined above or at least provide a useful alternative.

SUMMARY

According to one aspect, the present invention provides a method of forming a pot for an array of hollow fibre membranes including the steps of: placing the ends of said fibre membranes in a mould; forming a first layer of curable resin material in a non-cured state around said fibre membrane ends, applying a second layer of polyurethane resin material to said first layer prior to full curing of said first layer, said second layer of polyurethane resin material being chemically reactive with said first layer material to form an adhesive bond therebetween; at least partially curing both layers and removing the pot formed from said mould, wherein said second layer material is of higher flexibility than said first layer material when each layer is fully cured.

It will be appreciated that any known method of sealing the open fibres may be used prior to the potting process described above.

Preferably, the curable resin material is an epoxy resin. The use of an epoxy resin has been found to be advantageous when potting fibre membranes which typically contain hydroscopic liquids which may produce sealing problems between the fibres and the pot when polyurethane resin is used.

In one preferred form the layer of higher flexibility is produced by adding one or more flexibilising agents to the components of the material forming the first layer of lower flexibility.

Preferably, the method includes the step of the monitoring the curing process of the first layer to determine the optimal time in which to apply the second layer thereto. For preference, the step of monitoring includes monitoring the temperature changes within said first layer to determine the state of the curing process.

It is important that the second layer be applied to the first layer prior to curing of the first layer being completed so that there are sufficient active sites available for the chemical reaction required to adhere one layer to the other can take place. Proper adhesion of the two layers is required to prevent ingress of feed between the layers and growth of bacteria etc. between the layers leading to damage and breakage of fibres and consequential contamination of the filtrate. The use of this process also eliminates the need for special adhesives and primers to produce adhesion between the layers.

A necessary condition for the adhesion of the two layers is the chemical reaction between some of the components of the two different layers. For epoxy/polyurethane layers, it is desirable that one of the epoxy components is reactive with the isocyanate groups of the polyurethane (preferably amines or amides).

According to a second aspect, the present invention provides an apparatus for potting hollow fibre membranes including:

a mould for receiving the ends of said hollow fibre membranes;

means for forming a first layer of curable resin material in a non-cured state around said fibre membrane ends in said mould, means for applying a second layer of polyurethane resin material to said first layer prior to full curing of said first layer, said second layer polyurethane resin material being chemically reactive with said first layer material to form an adhesive bond therebetween and said second layer polyurethane resin material being of higher flexibility than said first layer material when each layer is fully cured.

Preferably, the mould includes separate means for flowing said first and second layer materials into the mould. For preference, said materials are fed into a centrifuge before being flowed along a conduit or tube into the mould. Preferably, a single centrifuge may be used having separate sections to receive the respective first and second layer materials.

Although, a centrifuge is the preferred tool used in the method, it will be appreciated that other techniques such as static potting are equally applicable to the inventive method.

BRIEF DESCRIPTION OF THE DRAWINGS

A preferred embodiment of the invention will now be described, by way of example only, with reference to the accompanying drawings in which.

DETAILED DESCRIPTION

Figure 1:
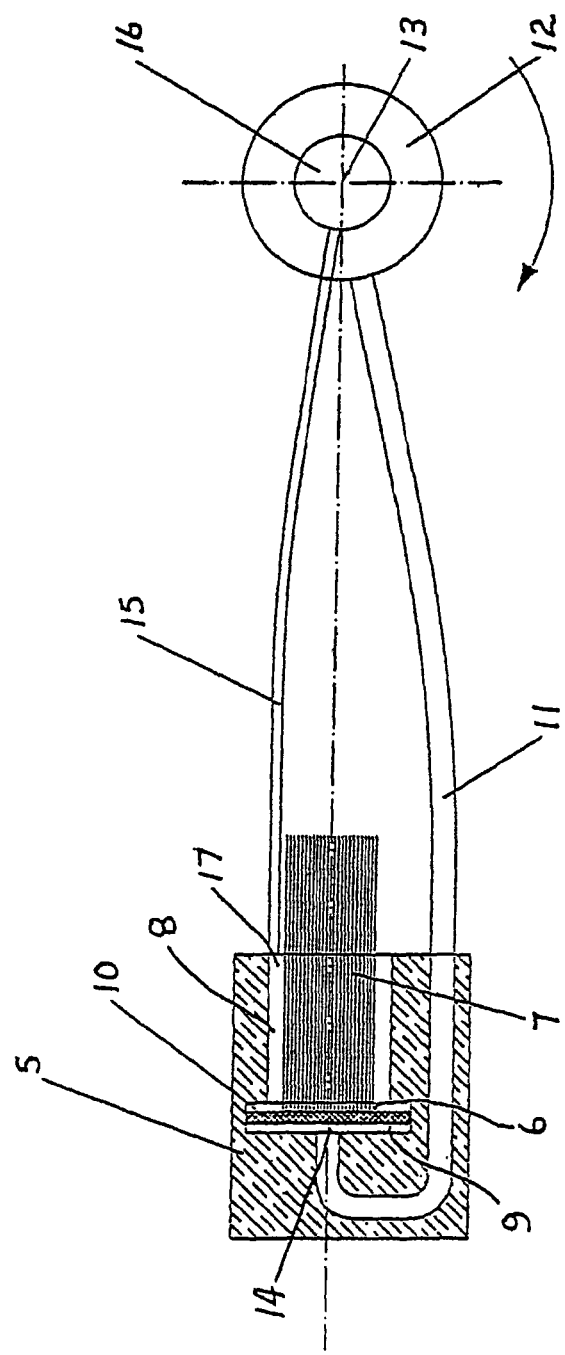
FIG. 1 shows a simplified schematic diagram of the potting apparatus used to perform the potting method in accordance with one embodiment of the present invention.

Referring to FIG. 1, the potting apparatus comprises a mould 5 for receiving the ends 6 of the fibres membranes 7. The mould 5 includes a cylindrical cavity 8 for receiving the fibre membranes 7. The cavity 8 has an enlarged-diameter base portion 9 for holding the prepot 10 which serves to support the fibres during the potting process. A tube or hose 11 connects one bowl 12 of a centrifuge 13 to the base 14 of the mould cavity 8. A second tube 15 connects a second bowl 16 of the centrifuge 13 to the upper portion 17 of the mould cavity 8.

In use, the material for forming the first relatively hard layer of the pot is dispensed into bowl 12 of the centrifuge 13 and flowed along tube or hose 11 into the lower portion 14 of the mould cavity 8 to form a first layer around the fibre ends 6. Prior to full curing of this material, a second material for forming the second softer layer is dispensed into bowl 16 and flowed along tube or hose 15 into the mould cavity 8 to apply the second layer of material to the first layer. The layers chemically react to form an adhesive bond between the first and second layers. At an appropriate curing stage the potted fibres are removed from the mould 5.

In some applications, it may be possible to use a single bowl and tube to flow the materials sequentially into the mould to form the two layers.

In order to determine the optimal time during the curing of the first layer for applying the second layer, the temperature profile of the first layer material may be monitored, at least during the initial set up of the process. The temperature profile indicates the various stages of the curing process and when the second layer may be applied to ensure that sufficient free sites are available for chemical bonding between the two layers. Once the optimal time has been determined for a particular material combination further monitoring is unnecessary.

A steep rise in temperature indicates that the majority of the curing reaction is taking place. The optimal time for the addition of the second layer has been found to be within ±5 minutes of the time of this temperature rise and preferably, ±2 minutes.

Figure 2:
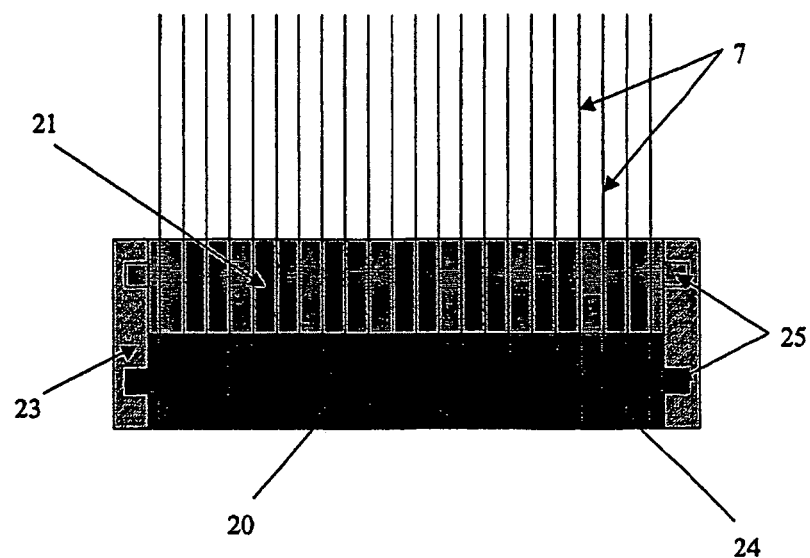
FIG. 2 shows a cross-sectional view of one potted end of the fibres illustrating one embodiment of the invention.

The embodiment shown in FIG. 2 illustrates a method using a potting sleeve 23 to enhance the interfacial binding between the potting layers 20, 21. The quantity of potting materials or the width of the potting sleeve 23 is selected to ensure that the interface 24 of the two layers is within the potting sleeve 23. The potting sleeve 23 is formed from material which ensures good adhesion between its inner surface and the two potting materials. Besides the selection of the potting sleeve material, roughening the inner surface of the sleeve 23 can also enhance the binding of the potting materials with the sleeve 23. Further enhancement can be achieved by forming grooves 25 in the potting sleeve 23. Due to the adhesive force between the potting materials and the potting sleeve 23, it serves to reduces any movement or detachment of the two potting layers 20, 21 at the interface 24, and therefore enhances the binding of the two potting layers 20, 21.

The potting method outlined above provides a number of advantages over the prior art including improved support of the fibres serves to reduce breakages at the fibre/pot interface. In some applications it is also possible to dispense with the usual potting sleeve as the pot formed by this method has sufficient rigidity to be self-supporting. This produces a manufacturing saving as in some cases shrinkage of the potting materials relative to the potting sleeve produces gaps which are again undesirable in terms of leakage and bacterial growth. In such cases the pot must be discarded.

It will be appreciated that further embodiments and exemplifications of the invention are possible without departing from the spirit or scope of the invention described.

What is claimed is:

1. A membrane module comprising:
at least one hollow fibre membrane;
a first resin layer formed around an end of the at least one hollow fibre membrane;
a second resin layer chemically bound to the first resin layer, wherein the second resin layer is of greater flexibility than the first resin layer; and
a potting sleeve constructed and arranged to receive the first and second resin layers, the potting sleeve including a first groove formed on a surface of the potting sleeve in contact with and adhered to the first resin layer and a second groove formed on a surface of the potting sleeve in contact with and adhered to the second resin layer, a portion of the first resin layer extending into the first groove and a portion of the second resin layer extending into the second groove.

2. The module of claim 1, wherein the first resin layer comprises an epoxy resin material.

3. The module of claim 2, wherein the second resin layer comprises a polyurethane resin material.

4. The module of claim 3, wherein an isocyanate group of the polyurethane resin material is chemically reacted with an epoxy group of the epoxy resin material.

5. The module of claim 1, wherein the second resin layer comprises a flexibilizing agent.

6. The module of claim 5, wherein the first and second resin layers comprise the same resin material.

7. The module of claim 1, wherein the end of the at least one hollow fibre membrane is sealed.

8. The module of claim 1, wherein the potting sleeve comprises adhesion means, wherein the adhesion means assist in adhesion of at least one of the first and second resin layers to the potting sleeve.

9. The module of claim 8, wherein a surface of the potting sleeve in contact with at least one of the first and second resin layers is roughened.

10. The module of claim 8, wherein the potting sleeve comprises at least one protrusion formed on a surface of the potting sleeve in contact with at least one of the first and second resin layers.

* * * * *